United States Patent [19]

Francioni

[11] Patent Number: 4,962,844
[45] Date of Patent: Oct. 16, 1990

[54] METHOD FOR REGULATING THE ADVANCE OF PRODUCTS IN AUTOMATIC PACKAGING EQUIPMENT, AND EQUIPMENT OPERATING ACCORDING TO THE METHOD

[75] Inventor: Renzo Francioni, Prato Sesia, Italy

[73] Assignee: Cavanna S.p.A., Italy

[21] Appl. No.: 367,876

[22] Filed: Jun. 19, 1989

[30] Foreign Application Priority Data

Dec. 30, 1988 [IT] Italy ............................ 68175 A/88

[51] Int. Cl.⁵ ............................................ B65G 47/26
[52] U.S. Cl. ................................... 198/460; 198/462;
  198/572; 198/575
[58] Field of Search ............... 198/460, 461, 462, 444,
  198/524, 571, 572, 575, 573

[56] References Cited

U.S. PATENT DOCUMENTS

| | | | |
|---|---|---|---|
| 3,944,049 | 3/1976 | Graybill . | |
| 3,998,319 | 12/1976 | Memoe | 198/572 X |
| 4,190,146 | 2/1980 | Knuckel . | |
| 4,197,935 | 4/1980 | Aterianus et al. | 198/461 X |
| 4,281,756 | 8/1981 | Bruno . | |
| 4,391,362 | 7/1983 | Spinelli | 198/444 |
| 4,718,538 | 1/1988 | Löw et al. | 198/462 X |
| 4,755,093 | 7/1988 | Francioni | 414/788.4 |
| 4,852,717 | 8/1989 | Ross et al. | 198/460 X |

FOREIGN PATENT DOCUMENTS

| | | | |
|---|---|---|---|
| 367751 | 11/1963 | Switzerland | 198/462 |
| 1356384 | 6/1974 | United Kingdom | 198/462 |
| 2197283 | 5/1988 | United Kingdom . | |
| 0216726 | 4/1987 | European Pat. Off. . | |
| 3826872 | 3/1989 | Fed. Rep. of Germany . | |
| 2182299 | 5/1987 | United Kingdom . | |
| 2001608 | 2/1979 | United Kingdom . | |

Primary Examiner—H. Grant Skaggs
Assistant Examiner—D. Glenn Dayoan
Attorney, Agent, or Firm—Evenson, Wands, Edwards, Lenahan & McKeown

[57] ABSTRACT

Conveyors are interposed between a product-supply station and a product handling station and are divided into several sections in cascade on which products accumulate when the handling station stops. When the handling station stops, the sections also stop in turn as the accumulating products gradually fill each section. The handling station is then restarted at a speed higher than its normal operating speed so as to use up the products accumulated previously. The handling station has an associated conveyor for metering the products and an associated conveyor for spreading out the products, arranged in cascade. The movements of the metering conveyor and of the accumulation sections are regulated in a coordinated manner so as to minimize the pressures applied to the products.

16 Claims, 7 Drawing Sheets

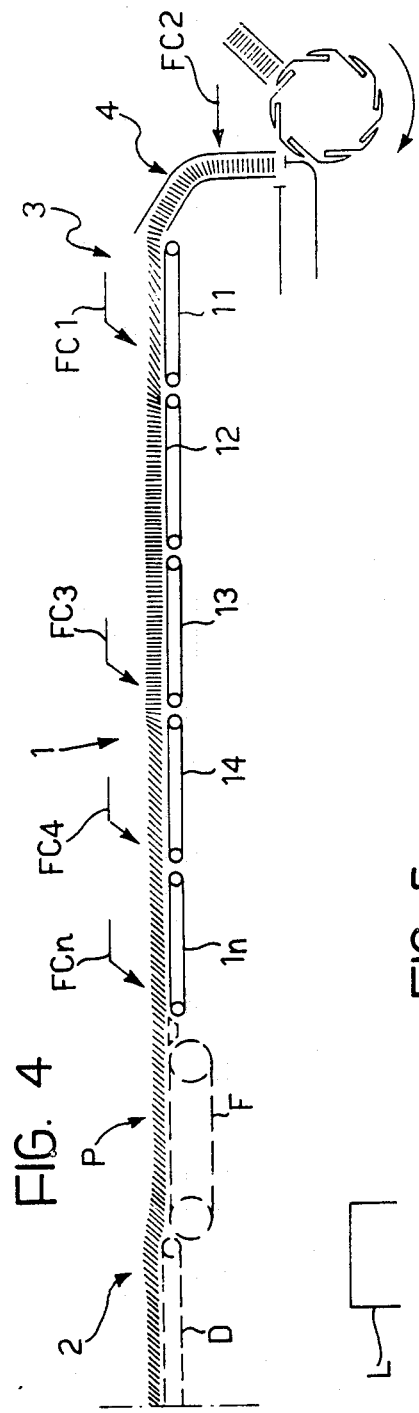
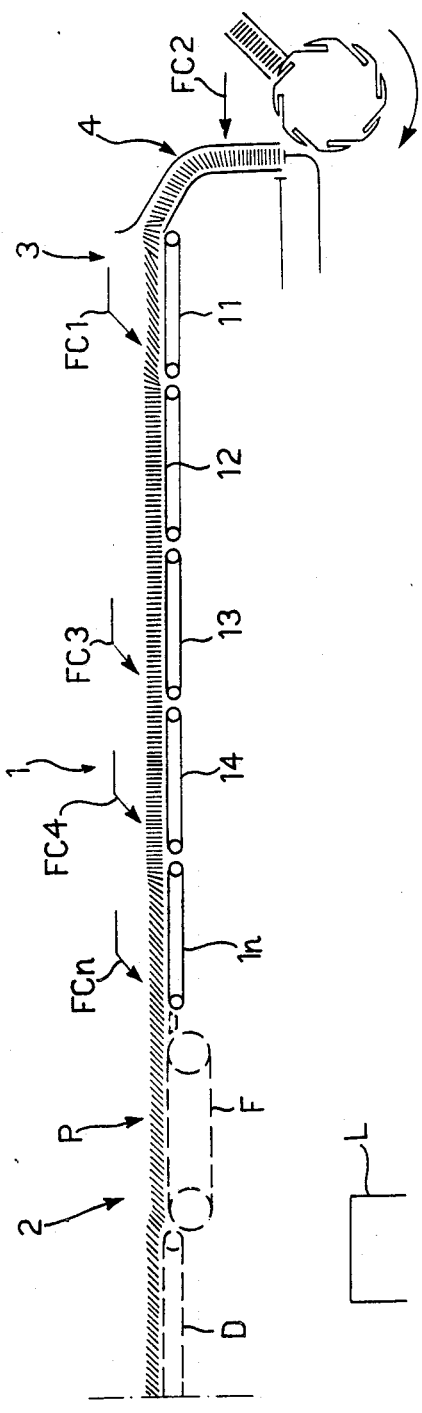
FIG. 4
FIG. 5

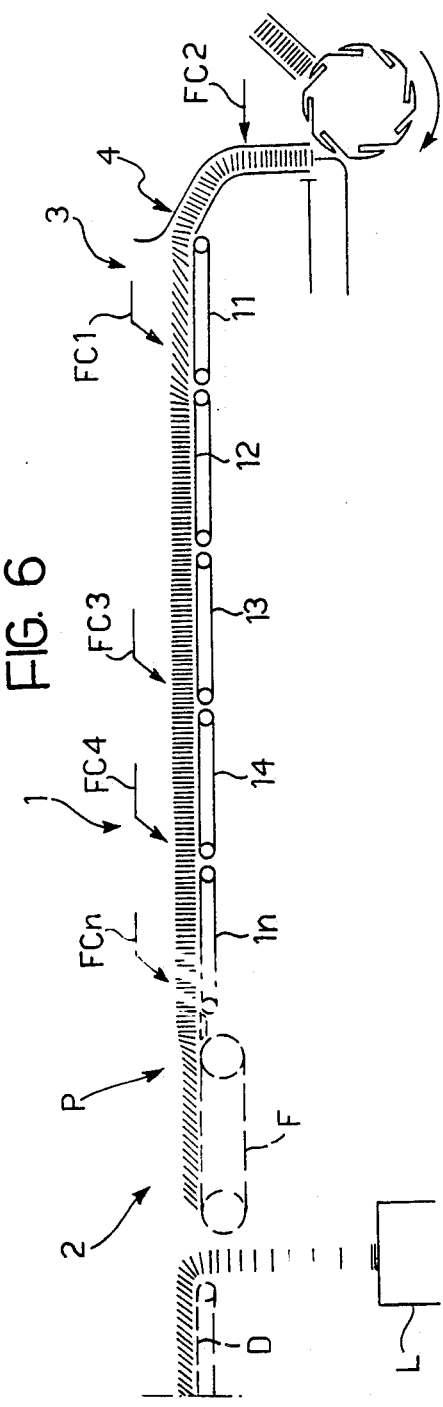
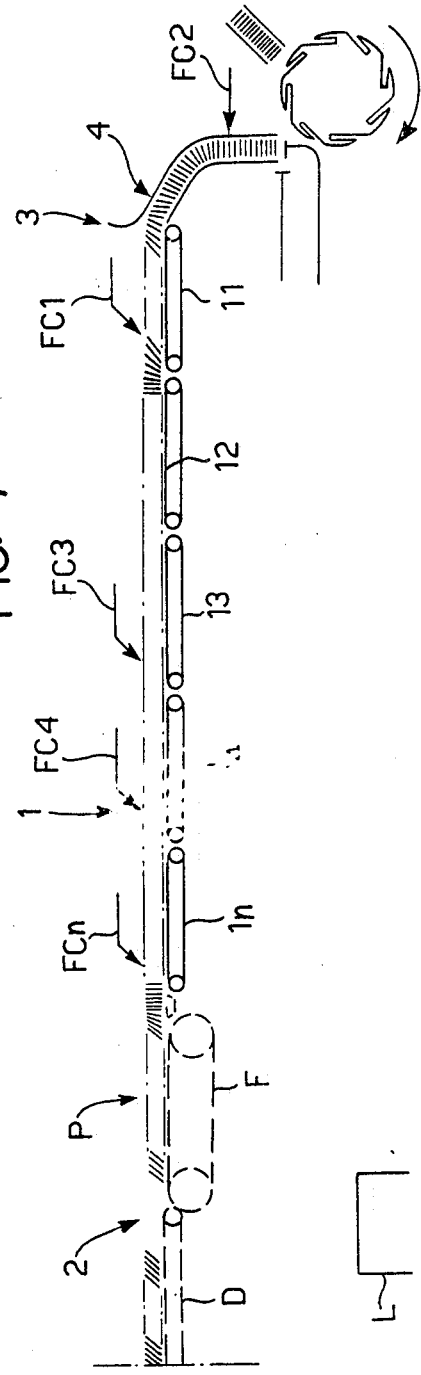
FIG. 6
FIG. 7

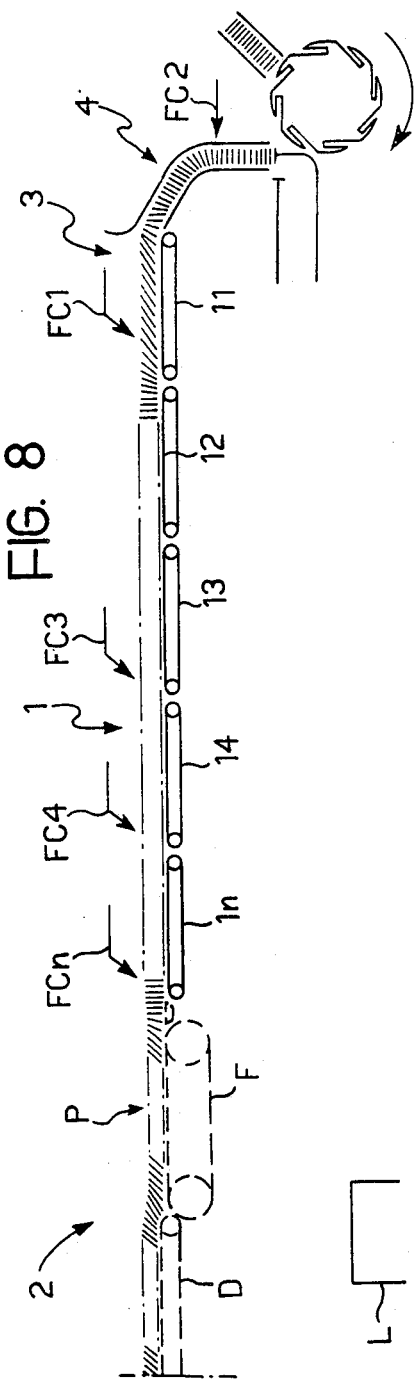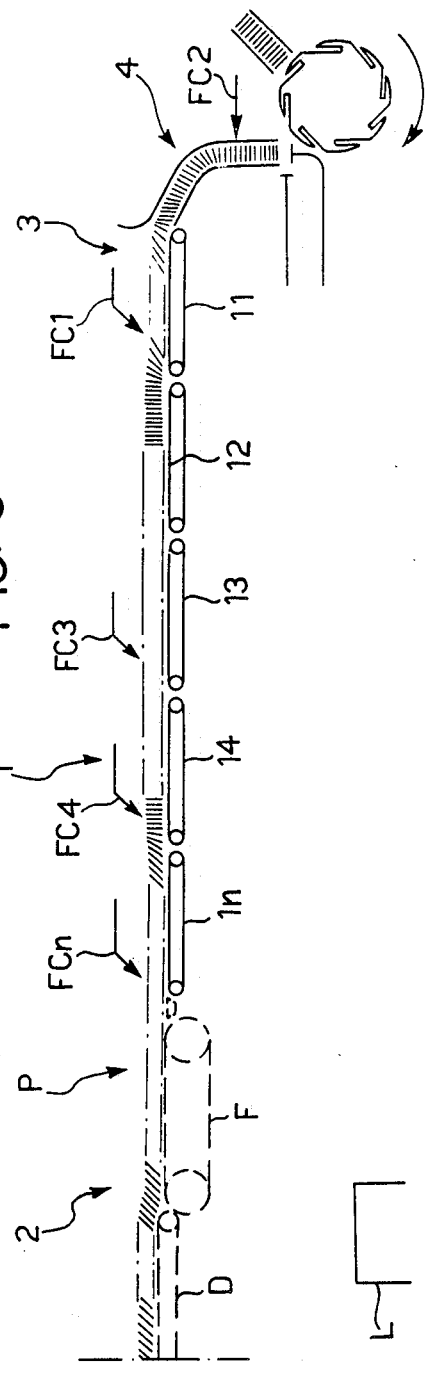

METHOD FOR REGULATING THE ADVANCE OF PRODUCTS IN AUTOMATIC PACKAGING EQUIPMENT, AND EQUIPMENT OPERATING ACCORDING TO THE METHOD

BACKGROUND OF THE INVENTION

The present invention relates to automatic equipment in general for packaging products, for example food products such as biscuits, chocolate bars, etc.

More precisely, the present invention relates to a packaging system in which the products to be packaged advance from a supply station towards a handling station which is situated downstream of the supply station in the direction of flow of the products and which may stop for certain periods of time, motor-driven conveyor means being interposed between the supply station and the handling station for collecting products which accumulate during periods of stoppage of the handling station.

In known embodiments of such a system, the conveyor means are usually constituted by a conveyor of sufficient length to be able to hold a quantity of accumulated products which corresponds substantially to the quantity of products which emerges from the supply station during a period of time substantially equal to the maximum period of stoppage envisaged for the handling station. Naturally, in the event of a longer stoppage of the latter station it is necessary to provide a function for discharging (dumping) the products which continue to emerge from the supply station at some point in the system.

Even if the problem of product wastage is disregarded, the prior-art storage solutions can certainly not be considered optimal for various reasons.

In the first place, when the handling station is restarted, the first products transferred to it may not be arranged ideally.

This is particularly true when one considers that, in most systems of the type specified above, the products normally advance with a forward or backward inclination, in a partially-superposed condition ("shingled" or "stacked", according to current English terminology) but, in accumulated conditions, are packed closely together, in face-to-face contact (that is in a vertical position).

While a row of partially-superposed products (shingled or stacked) still has a certain capacity to contract longitudinally, a row of products in close contact (that is "packed") is practically incompressible so that the products which are furthest forward in such a pile of closely-packed products are subject to considerable pressure from the products which gradually accumulate upstream with the consequent risk that the products may break and soil the equipment, possibly stopping the handling station again just as it is being restarted or a short time thereafter.

The problems outlined above are even more serious when it is considered that systems of the type specified are usually made to deal with several flows ("lanes") of products in parallel. This means, for example, that the quantity of products wasted in the event of discharge (dumping), or damaged as a result of excessive pressure, can be quite considerable.

Moreover, the operation of the system is made even more critical by the fact that, even if the operating speed of the handling unit is kept rigorously constant (in terms of items accepted per minute), the corresponding speed of linear advance of the products (identified by the number of products dealt with per unit time multiplied by the space occupied by each product) may vary, for example, due to a variation in the thickness of individual products: this is the case, for example, with some baked products such as biscuits and the like for which it is certainly not possible to ensure that very strict dimensional tolerances are respected absolutely.

The rate at which the products are supplied by the supply station (for example an oven) may also be subject to significant variations, for example as a result of an event which leads to the discarding of a quantity of products which are not acceptable from a qualitative point of view, for example, overcooked biscuits.

As a result, even if the speed at which the products are taken in by the handling unit is regulated so as to correspond generally with the rate of supply of products from the supply station, it is necessary to interpose product conveyor means between the two stations to absorb random variations without damaging the products and/or leading to excessive wastage thereof.

OBJECT OF THE INVENTION

The object of the present invention is to provide, within a packaging system of the type specified above, a solution in which the above problems are completely eliminated.

A first aspect of the present invention relates to a method of the type specified above, characterised in that it comprises the steps of:
  dividing the motor-driven conveyor means into a plurality of sections in cascade, with the furthest downstream section facing the handling station,
  monitoring the flow of products on the sections so as to identify, for each section, at least one normal operating condition and one condition in which the section is filled with accumulated products, and
  controlling the movement of each of the sections when in its filled condition is detected so that the movement of each section copies the movement of the section immediately downstream, the movement of the section furthest downstream copying the movement of the handling station.

A further aspect of the present invention relates to a method for regulating the advance of products to be packaged towards a handling device which can take in the products at a first given speed, characterised in that it comprises the steps of:
  providing, upstream of the handling device in the direction of flow of the products, first conveyor means for metering the products and second conveyor means for spreading out the products, the second conveyor means moving at a speed substantially greater than the first conveyor means,
  monitoring the flow of products on the second conveyor means and identifying at least one first and one second operating condition corresponding respectively to a satisfactory flow and to a reduced flow of products, and
  causing the first conveyor means to move at:
  at least one first metering speed which is slightly slower than the first given speed when a satisfactory flow of products is detected on the second conveyor means, and
  at least one metering speed which is faster than the first given speed when a reduced flow of products is detected on the second conveyor means.

The invention also relates to equipment which operates in accordance with the above methods.

BRIEF DESCRIPTION OF THE DRAWINGS

The invention will now be described, purely by way of non-limiting example, with reference to the appended drawings, in which:

FIGS. 2 to 9 show schematically the equipment according to the invention in various possible operating phases.

FIG. 1 shows schematically a portion, indicated 1, of equipment for the automatic packaging of products P, for example, food products such as biscuits, chocolate bars, etc.

DESCRIPTION OF THE PREFERRED EMBODIMENT

Figure 1:
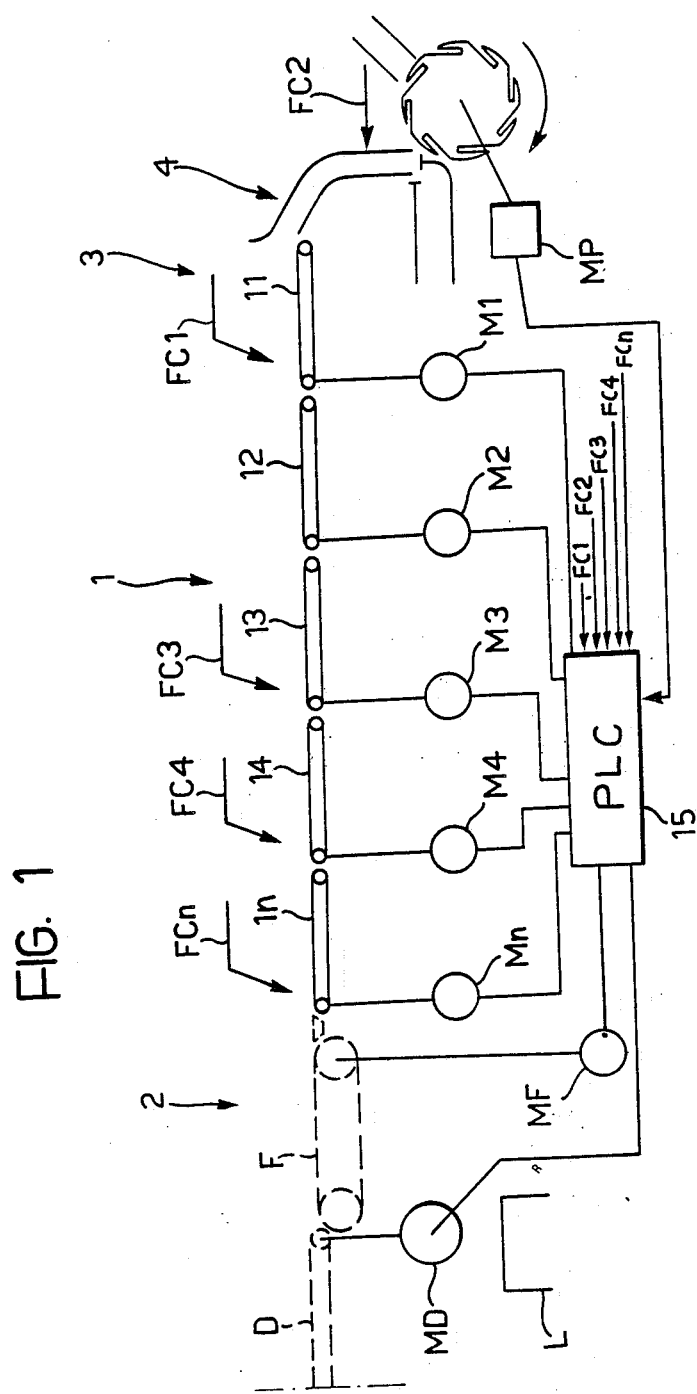
FIG. 1 shows schematically, in the form of a block diagram, the structure of equipment according to the invention.

The products P in question (not shown specifically in FIG. 1) advance from left to right with reference to the arrangement shown in FIGS. 1 to 9 from a supply station 2 to a handling station 3.

The supply station 2 may be constituted, for example, by an oven which discharges products P, such as biscuits which have just been baked, at a given rate (n items/minute).

Only two output conveyors of this station are visible in the drawings, these being indicated D and F respectively and being arranged in cascade and provided with respective motors $M_D$ and $M_F$.

A collecting container L is provided beneath the conveyor D for collecting any products P which are to be discarded during the operation of the equipment, according to criteria which will be described more fully below.

Solutions widely known in the art, such as, for example, continuous-belt conveyors, which do not need to be described in detail, may be used as the conveyors D and F (just as for all the other conveyors to which reference will be made below).

This is also true as regards the respective motor-drive units $M_D$, $M_F$ and the motor drive units of all the other conveyors to which reference will be made below.

Further motor means (also of known type) are also associated with the conveyor D for enabling the conveyor D to be retracted from the conveyor F downstream thereof so that the products P advancing on the conveyor D fall into the container L, as will better be described below.

The handling station 3 may be constituted, for example, by a device 4 for forming piles of products (biscuits or the like), such as the device which forms the subject of Italian Patent No. 1,186,412 and the corresponding U.S. Pat. No. 4,755,093 in the name of the same Applicant. For a detailed description of the operation of such a station, reference should therefore be made to the descriptions of these previous patent documents.

Between the supply station 2 and the device 4 which is driven by a respective motor MP, several belt conveyors are arranged and are indicated in reverse order, from downstream to upstream in the direction of advance of the products P, by the progressive reference numerals 11, 12, 13, 14 . . . , 1n. The number of conveyors is not important for an understanding of the present invention and may be determined in dependence on specific applicational requirements.

In this connection, and also to facilitate an understanding of the following description, it should be noted that the conveyors 11 and 12 (also referred to below as the "spreading" and "metering" conveyors) constitute elements which are closely linked, from a functional point of view, with the device 4 so that they can, in fact, be considered as forming part of the handling station 3. The conveyors 13, 14 . . . 1n, however, constitute a pass for the accumulation of products between the source supply station 2 and the handling station 4.

The length of the accumulation pass is selected, in general terms and according to known criteria, in relation to the expected flow of products P between the station 2 and the station 4 so as to enable a quantity of products P to be accumulated which is substantially equal to the number of products which flow from the station 2 towards the station 4 in a period equal to the maximum duration of an expected period of stoppage of the handling station 3.

The periods of stoppage result from the fact that the handling station 3 may in certain circumstances, be subject to conditions which make the taking in of new products P impossible. For example, if a wrapping machine is situated immediately downstream of the handling station 3, when the reel of wrapping film supplying the wrapping machine runs out, it is necessary to stop the handling station 3 (the pile-forming station) for a period equal to the time required for the insertion of a new reel of wrapping film in the wrapping machine.

As regards the selection of the number of sections (13, 14, . . . , 1n) into which the accumulation pass is divided, account must be taken both of the need to achieve good flexibility in dealing with accumulations (which may lead to an increase in the number of sections) and the need not to reduce the length of each section excessively and so increase the complexity of the system.

In this connection, it should be remembered that, although most of the following description is made with specific reference to a single flow or line ("lane") of products P to be packaged, the equipment according to the invention is, in general, able to deal with a plurality of flows of products P advancing in parallel.

Whatever the number of sections provided, the various conveyor sections 11, 12, 13, . . . 1n each have a respective motor $M_1$ . . . $M_n$ and (with the exception only of the metering conveyor 12) a respective monitoring photocell FC1 . . . FCn which operates near the upstream end of each section and can detect when the section is completely full of accumulated products P, that is, products which are closely packed in conditions such as not to allow any more products to be collected on that section.

In practice, the photocells FC1, . . . , FCn are each constituted by an optical system and associated circuit means which can detect the presence or absence of objects in the focal region of the optical system.

The photocells FC1, . . . , FCn are products which are generally commercially available; they may, for example be optical monitors sold under the reference WT18P11 by the Sick Company.

Such a photocell may, for example, be mounted so that when the products P advancing on the respective conveyor section are partially packed together (shingled or stacked), their tops are further away than the focal length of the respective optical system. When, as a result of a gradual accumulation, the products P are more closely packed and oriented vertically, their tops approach the focal plane (and possibly cross it), causing a change in the signal output by the photocell.

The above is true primarily for the photocells $FC_3 \ldots FC_n$ associated with the upstream ends of the conveyors $13, \ldots, 1n$.

The photocell FC1 associated with the conveyor 11 for spreading out the products is mounted in a slightly different position (in general nearer the transporting surface of the conveyor) so as to enable two different operating conditions to be distinguished, that is to say:
- a condition in which the flow of products on the conveyor 11 is to be considered sufficient to ensure that the device 4 operates correctly, and
- a condition in which the flow is becoming too spaced out (reduced), with the risk, for example, of losing the at least partial packing together of the products, which could create difficulties in the operation of the device 4.

Finally, the photocell FC2 is associated directly with the device 4 (for example with the supply slide or chute of the equipment according to Italian Patent No: 1,186,419, which corresponds to U.S. Pat. No. 4,755,039) and can distinguish absolutely:
- the presence of a number of products P sufficient to ensure the correct operation of the device 4, or
- a radical reduction in the flow such as to make the continued operation of the device critical.

The signals output by the various photocells $FC_1 \ldots FC_n$ are supplied to a main control unit 15 constituted, for example, by a PLC controller (of known type) which controls the operation of the motors $M_1 \ldots M_F$, $M_D$ and of the motor MP which drives the device 4, in accordance with decision criteria which will be described more fully below.

The specific modes of operation and programming of the unit 15 can easily be defined by an expert in the art on the basis of the logic-decision information which will be given below and in dependence on the specific characteristics of the unit 15 used at any time; a detailed description of these modes is therefore wholly superfluous.

The operating criteria of the equipment according to the invention will now be described first of all, for reasons of clarity, by a description of the operation of the spreading and metering conveyors 11 and 12 arranged immediately upstream of the device 4.

The operation criteria of the conveyors $13, 14, \ldots, 1n$, F and D situated upstream will then be described with specific reference to the sequence shown in FIGS. 2 to 9, the conveyors 11 and 12 being considered as incorporated in the handling station 3.

In order to establish the concept, it will be remembered that, in general, the speed of advance of the products P through the equipment 1 is determined by the rate at which the products leave the supply station 2. For example, if the latter is constituted by an oven, the rate will be determined primarily by the number of products P discharged from the oven per unit time (e.g. products/minute).

Initially, the operating rate of the handling station 3 is regulated to the same value so as to ensure the general equilibrium of the system. In fact the handling station 3 must take in, on average, as many products P as are discharged from the supply station 2: otherwise there would either be an accumulation of products P which had not been handled or a chronic shortage of products P for handling in the station 4. The rate of advance of the products on the conveyors $11, 12 \ldots 1n$, F,D, is determined, in general, by the product of the number of products P discharged from the supply station 2 per unit time and the space occupied by an individual product in the general direction of advance. This space is determined by the thickness of an individual product multiplied by an inclination factor which has a value of one when the products are upright and packed against each other and assumes increasing values the more the products P are only partially packed together and are arranged in an overlapping manner with a forward ("shingled") or rearward ("stacked") inclination.

As already stated, one of the main objects of the invention is to prevent any formation of queues of accumulated products P, which can happen in some operative conditions and which may result in excessive pressure on the products P which are supplied to the device 4.

The function of the metering conveyor 12 is essentially to form a kind of barrier for isolating the products P supplied to the device 4 from the products upstream, that is, on the conveyors $13, 14, \ldots, 1n$.

For this purpose, the speed of movement $V_{M2}$ selected for the metering conveyor 12 is generally approximately the same as the speed $V_{MP}$ at which the products are taken in by the device 4 which corresponds to the product of the number of products taken in by the device 4 per unit time and the thickness of each individual product. This means that the products P may tend to accumulate on the metering conveyor 12 as a queue of closely-packed products.

In the equipment according to the invention, the speed $V_{M2}$ of the metering conveyor 12 can be varied between two values constituted respectively by:
- a first value which is slightly slower (for example 1-5%) than the speed at which the products are taken in by the handling station 4 (that is $V_{M2}$ is approximately $\leq V_{MP}$), and
- second value which is generally faster than the speed at which products are taken in (that is $VM_2 = V_{MP} + K$, where K is a speed which is determined experimentally in dependence on the characteristics of the system. This experimentation takes into consideration, the output rate of the initial feed of the system, the type and condition of the goods, the ability of the system to run at higher speeds, the ability of the collector to stack faster, etc.)

The selection of one or other of the values is determined by the result of the monitoring carried out by the photocell FC1 which is sensitive to the flow condition of the products P on the spreading conveyor 11.

The speed of movement selected for this latter conveyor is noticeably faster than the speed of advance of the products P on the metering conveyor 12 so that the products tend to expand again (or "spread out") on the conveyor 11 from the condition in which they are packed closely together on the metering conveyor 12.

This means that the line of products P on the spreading conveyor 11 is never rigidly compact but has a certain capacity to expand and contract in dependence on possible fluctuations in the speeds of advance of the products both upstream and downstream.

For example the speed of advance of the spreading conveyor 11 may be permanently dependent on the speed $V_{MP}$ of the device 4, being set at a value of approximately $V_{MP}/\cos\alpha$, where $\alpha$ represents the desired angle of inclination of the products P on the spreading conveyor 11.

In any case, for reasons which will become clear from the following description, the speed of movement $V_{MP}$ of the device 4 can be varied between a normal operating value and an increased value for use after a stoppage, to dissipate any accumulations of products P which have formed on the conveyors 13, 14, . . . 1n during a stoppage of the handling station 3.

This means, in practice, that the metering conveyor 12 is in fact able to move at at least four different speeds whilst the spreading conveyor 11 is able to move at at least two different speeds.

Figure 10:
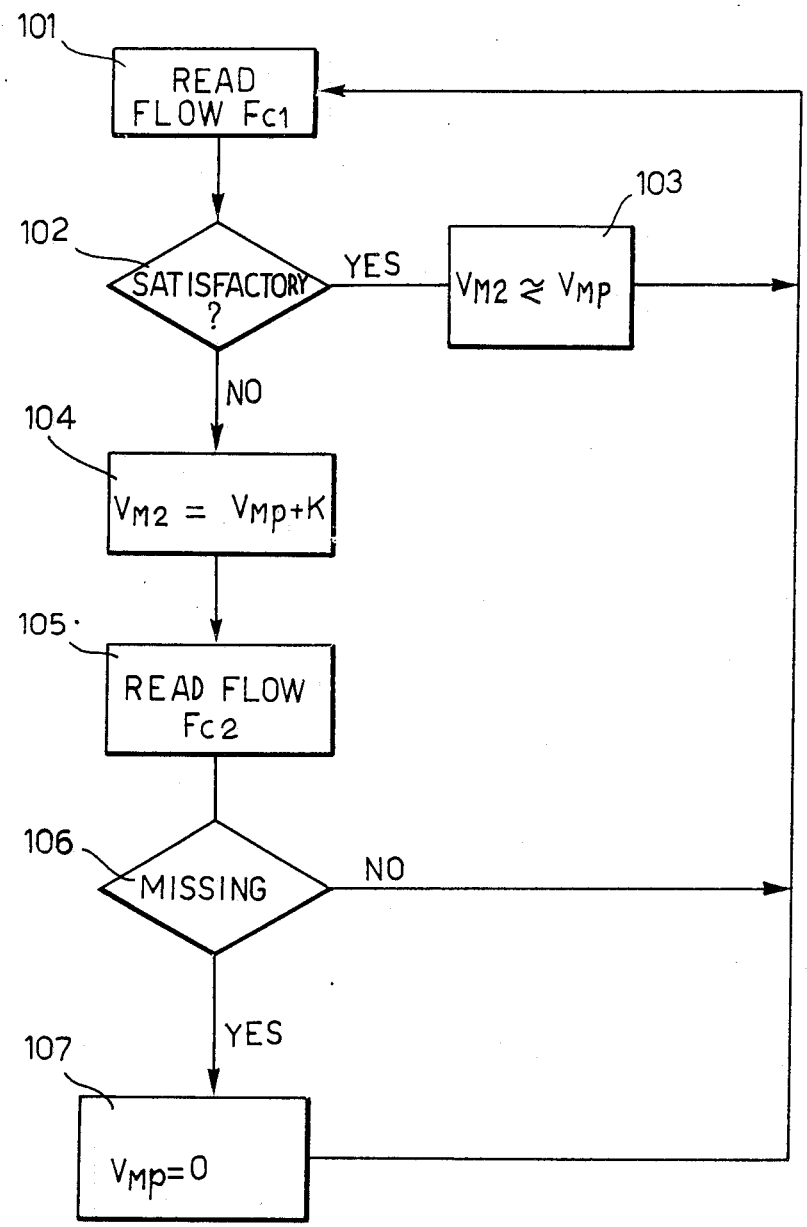
FIGS. 10 to 12 show, in the form of flow diagrams, the logic which regulates the operation of the control unit of the equipment according to the invention.

The criteria by which the processing unit (PLC) 15 regulates the operation of the metering conveyor 12 and of the spreading conveyor 11 by acting on the respective motors M1 and M2 may, therefore, be summarised as follows (see also the top part of the flow diagram of FIG. 10):

- the metering conveyor 12 can be made to operate at an operating speed $V_{M2}$ which is slightly slower than (for example 95–99% of) the speed $V_{MP}$ at which the products P are taken in by the device 4 (which speed, as has been seen, may itself be variable between at least two values),
- the photocell FC1 monitors the intensity of the flow present on the spreading conveyor 11 (phase 101) substantially continuously;
- the unit 15 analyses whether the flow is satisfactory or too spread out (phase 102) by comparing it with a given threshold level and, depending on the result of the monitoring by the cells FC1, either:
- keeps the operating speed of the metering conveyor 12 at a lower value $V_{MP} \leqq V_{MP}$—phase 103) whenever the flow of products P on the spreading conveyor 11 is satisfactory, or
- accelerates the movement of the metering conveyor 12 until it is brought to the value ($V_{M2} = V_{MP} + K$—phase 104) when the flow of products P on the spreading conveyor 11 is too spread out.

The selection, under normal operating conditions, of an operating speed for the metering conveyor 12 which is slightly slower than the speed at which the products P are taken in by the device 4 is intended to avoid any risk of a queue of packed, accumulated products P being formed immediately upstream of the device 4 with the risk of pressure, such as to cause damage, being applied to the products P being supplied to the device 4.

As stated, the function of the further photocell FC2 is to detect the situation in which there is a prolonged shortage of products P being supplied to the device 4.

This situation may arise, for example, when a certain quantity of defective products P is discarded in the region of the supply station 2.

In such conditions, a simple acceleration of the speed of the metering conveyor 12 would not be able to remedy this persistent shortage of products P.

For this reason, when the unit 15 detects, by means of the photocell FC2 (phase 105), that this shortage has arisen (phase 106), the unit 15 stops the device 4 ($V_{MP} = 0$—phase 107) so as to enable a certain quantity of products P to be handled to form immediately upstream of the device 4 itself. When this minimum quantity of products has been re-established, the device 4 is re-started automatically.

At least in principle, the function of the photocell FC2 could be carried out by the photocell FC1 alone by the association of the photocell with a timing function in the region of the unit 15 for detecting the persistence of an insufficient flow of products P on the spreading conveyor 11 over a certain period of time, irrespective of an increase in the speed of advance of the metering conveyor 12.

The effecting of this function by means of a separate photocell FC2 is, however, thought preferable in terms of general reliability.

As stated, the equipment according to the invention actually operates on several flows or lines ("lanes") of products P in parallel, each of which advances from a respective output opening of the supply station 2 to a respective input opening of the device 4.

In principle, it would be possible to provide a metering conveyor 12 with a corresponding control function for each line or flow. The Applicant has, however, found that the equipment can be made to operate completely satisfactorily by the subjection of the movements of all the lines in the region of the metering conveyor 12 to the decision logic developed with reference to the line or "lane" in which—at a particular time—the greatest flow of products is detected on the respective spreading conveyor 11.

According to one solution which has been shown to be very advantageous in terms of simplicity and economy, this enables a single metering conveyor 12 to be used for all the flows or lines, the speed of advance of the metering conveyor 12 being raised (by the unit 15) to the faster value ($V_{M2} = V_{MP} + K$) when, and only when, all the photocells FC1 have detected a reduced flow of products P in their respective lines or "lanes".

This choice ensures that an unwanted accumulation can never occur (with the consequent transmission of excessive pressure to the products P being handled), even on only one of the lines or "lanes" of the equipment.

For the purposes of the description of the operating criteria of the conveyors 13, 14 . . . 1n, both the supply station 2 and the handling station 3 may be considered theoretically as operating at practically constant speeds: this means, in particular, that the "oscillation" of the speed $V_{M2}$ of the metering conveyor 12 relative to the speed $V_{MP}$ of the device 4 described above can, in this context, be ignored.

Thus, for the purposes of the description of the operation of the conveyors 13, 14 . . . 1n, the conveyors 11 and 12 may in fact be considered as incorporated in the packaging station 3.

Under normal operating conditions (FIG. 2) all the conveyors, with the exception of the metering conveyor 12, travel at practically the same speed, which corresponds, in practice, to the product of the number of products P dealt with (that is discharged from the supply station 2 and handled by the handling station 3) per unit time and the longitudinal occupied by each individual product P, that is the thickness of the product multiplied by the factor which takes account of the need for the products P to have a generally-inclined attitude ("shingled" or "stacked"). In fact, the products P advance in this condition on all the conveyors except for the metering conveyor 12 on which the products P are packed together vertically in accordance with criteria already described above.

Figure 3:
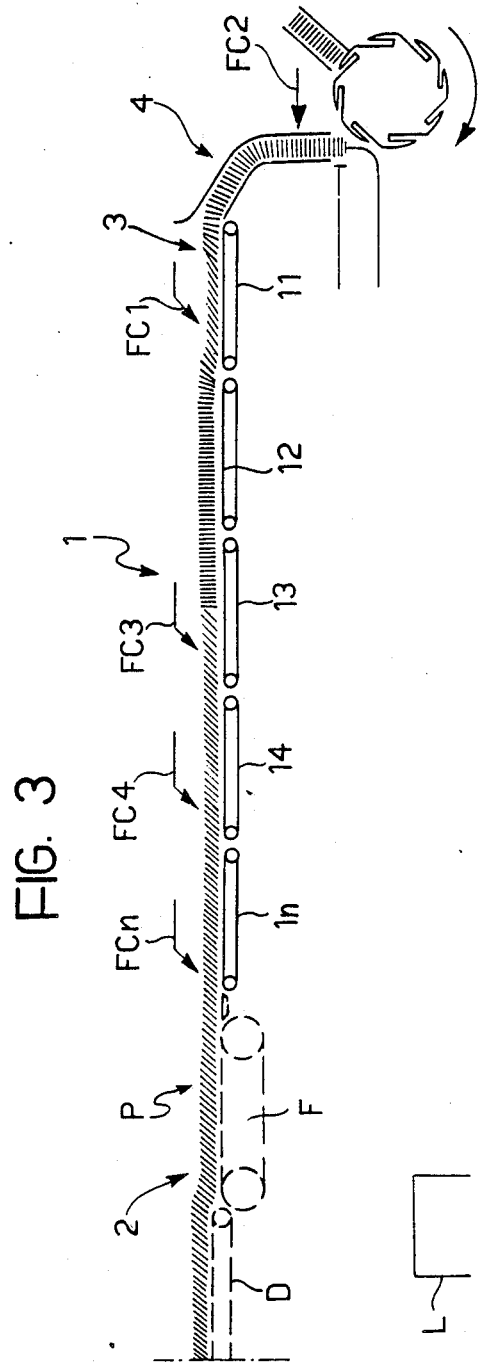

FIG. 3 shows a situation in which the handling station 3 (including the conveyors 11, 12) has just stopped, for example because of the need to replace the reel of wrapping film in a wrapping machine (not illustrated) immediately downstream.

As a result of the stoppage of the conveyor 12, the products P arriving immediately upstream begin to accumulate close together in face-to-face contact on the conveyor 13 until the condition (shown in FIG. 4) is reached in which the conveyor 11 is completely filled with products. This condition is detected by the photocell FC3 which sends a corresponding signal to the unit 15 which stops the conveyor $V_{M3}=0$).

If the stoppage of the handling station 3 persists, the process described above is repeated in an identical manner for the conveyor 14 immediately upstream (FIG. 5), and in successive stages until the accumulation conveyor furthest upstream, that is the conveyor 1n (FIG. 6), is reached.

Under these conditions, the storage capacity of the "storage unit" formed by the conveyors 13 ... 1n is completely used up: at this point—if the stoppage of the handling station 3 persists—the solution is to stop the supply of products P from the supply station 2, for example by the retraction of the conveyor D from the conveyor F so that the products P which continue to arrive from the supply station fall into the discard container L.

Naturally, a situation of this type arises, in practice, only under exceptional circumstances. The length of the "storage unit" constituted by the conveyors 13 ... 1n is in fact selected so as not to be completely used up as a result of the normal stoppages envisaged or expected for the handling station 3. This means that, in general, the station 3 will have been restarted before the products P have accumulated right back along the whole chain of conveyors 13, 14, ... 1n.

Clearly, if the station 3 restarts at any intermediate state in the accumulation (that is without the stoppage of all the conveyors 13, 14, ... 1n), the accumulation of products P can then be dissipated, possibly by the station 3 being made to operate at a speed $V_{MP}$ faster than its normal operating speed as is better shown in the restarting sequence in FIGS. 7 to 9. This sequence relates theoretically to the restarting of the station 3 after the occurrence of a general stoppage as shown in FIG. 6.

The restarting operation is carried out by the repositioning of the conveyor D close to the conveyor F (FIG. 7) so as to re-establish the supply of products P towards the handling station 3 and the simultaneous restarting of the handling station 3 at an operating speed $V_{MP}$ which is faster (for example by 25–50% more) than its operating speed under normal conditions.

The general operating mechanism of the conveyors 13, 14 ... 1n described above means that, in the presence of an accumulation (detected by the respective photocell FC2, FC4 ... FCn), each conveyor copies the movement of the conveyor immediately downstream $(V_{Mj}V_{M(j-1)})$ with the conveyor 13 (that is that situated furthest downstream of all) copying the movement of the handling station 3 as a whole, that is the movement of the metering conveyor 12.

With this copying mechanism, which is also adopted at the restarting stage, it is possible (in this connection compare FIGS. 8 and 9) for all the previously-accumulated products P to be dissipated gradually. In other words, the products P which are at first accumulated in a closely packed arrangement, are gradually advanced towards the handling station 3 (which works at a speed which is faster than normal) whilst the new products which advance from the conveyor 1n situated furthest upstream assume the normal, inclined orientation ("shingled" or "stacked").

The return to normal operating conditions as regards the orientation of the products on each conveyor 13, 14 ... 1n is detected by the respective photocells FC3, FC4 ... FCn as above, the operating speed of the conveyor being returned to normal as soon as the photocell detects that the accumulation previously formed on the conveyor has been dissipated.

Figure 2:
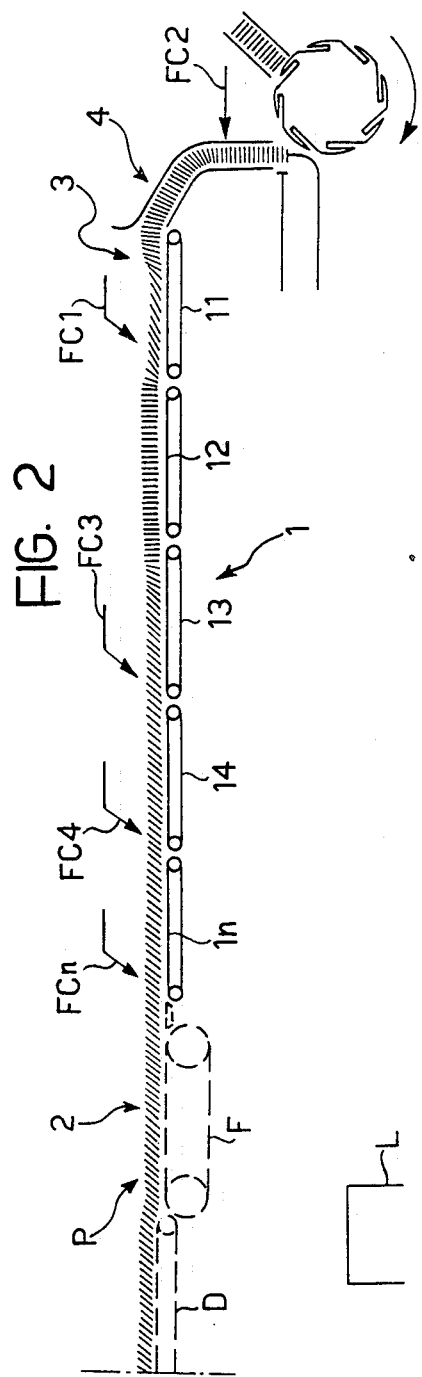

Naturally, this mechanism progresses from the conveyor 1n which is furthest upstream and proceeds gradually towards the conveyors furthest downstream until even the conveyor 13 is again operating at its normal speed. At this point (that is when the photocell FC3 has detected that the accumulation has dissipated) the operating situation shown in FIG. 2 is re-established so that the handling station 3 (including the conveyors 11 and 12) can be returned to its normal operating speed.

Naturally, the restarting mechanism described above can also be used in situations in which the "storage unit" does not become completely saturated with the accumulation as shown in FIG. 6. The temporary operation of the handling station 3 at a faster speed may in fact be advantageous in any case for taking up any accumulation rapidly.

Figure 11:
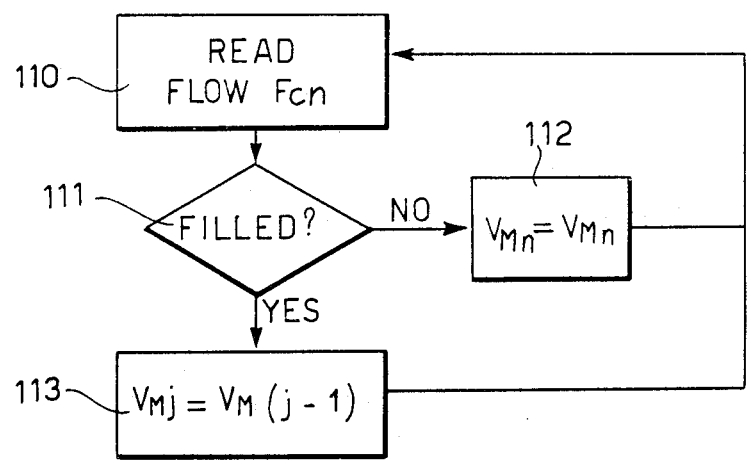

The flow diagram of FIG. 11 shows the logic which regulates the movement of the conveyors 14 ... 1n, which is determined essentially by the criterion of the monitoring by means of the respective photocell FC4 ... FCn (phase 119), of the existence of any situation of accumulation. In dependence on the result of this monitoring (phase 111), the speed of advance of the conveyor is kept at the normal level (phase 112) when no accumulation is detected.

When, however, the existence of an accumulation is detected, the mechanism by which each conveyor copies the speed of the next conveyor downstream is started (phase 113).

If the latter conveyor is stationary, the conveyor immediately upstream also stops. If the downstream conveyor is travelling at the speed for taking up the accumulation (since it is in the restarting phase and taking up the accumulation) the conveyor upstream also travels at that speed until the fact that the accumulation has been dissipated is detected when the conveyor returns to its normal operating speed.

Figure 12:
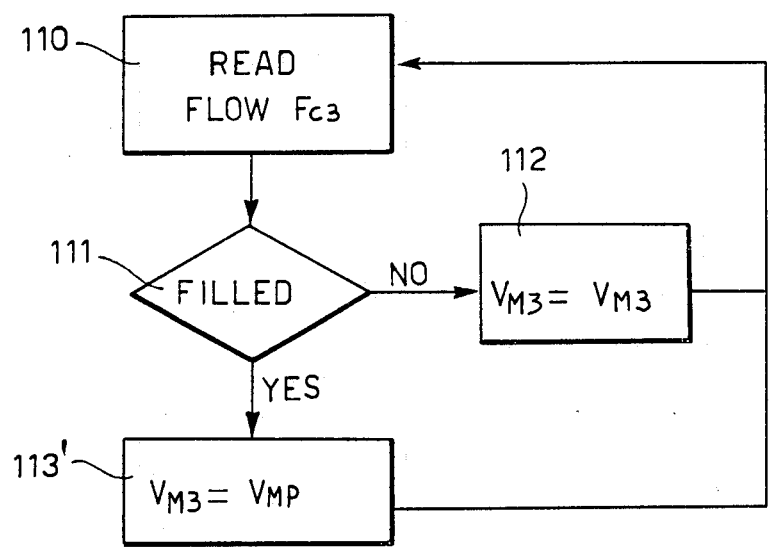

The flow diagram of FIG. 12 shows how this mechanism is also adopted substantially for controlling the conveyor 13.

In this case, however, the speed in the presence of an accumulation (detected by the photocell FC3) is made dependent on the operating speed $V_{MP}$ of the handling station 3 (phase 113'), that is of the metering conveyor 12.

By virtue of this operating mechanism, the conveyor 13 is able to achieve a general regulation of the advance of the products P from the supply station 2 to the handling station 3.

Naturally, it would also be possible to use a separate control system for each channel or flow ("lane") of the equipment in order to control the conveyors 13, 14 ... 1n. This would, however, be too onerous as regards circuitry and processor use. It is, however, possible to adopt a solution of generalised control even in this case, the conditions of the products in the various parallel flows or lines being observed by means of the respective photocells FC3 and the condition of "accumulation" or "lack of accumulation" which prevails in the majority of cases being determined, this prevalent condition being used as a parameter for the management of the operation of the equipment, thus unifying the various conveyors 13, 14 . . . 1n in the various flows or lines.

What is claimed is:

1. A method for regulating the advance of products to be packaged from a supply station towards a handling station which is situated downstream of the supply station in the direction of flow of the products and which stops for certain periods of time, motor-driven conveyor means being interposed between the supply station and the handling station for collecting products which accumulate during the periods of stoppage of the handling station, wherein the method includes the steps of:
   dividing the motor-driven conveyor means into a plurality of sections in series, with the furthest downstream section adjacent the handling station,
   monitoring the flow of products on the sections so as to identify, for each section, at least one normal operating condition and one condition in which the section is completely filled with accumulated products,
   controlling movement of each of the sections when its completely filled condition is detected so that movement of each section is the same as movement of the section immediately downstream, movement of the section furthest downstream being the same as movement of the section immediately downstream, movement of the section furthest downstream being the same as movement of the handling station,
   causing the handling station to operate at a given speed when the sections are all operating normally,
   detecting a condition in which at least some of the sections have stopped as a result of a stoppage of the handling station, and
   restarting the handling station at an accumulation-take-up speed which is faster than the given speed so that all the sections which are full also move at an accumulation-take-up speed.

2. A method according to claim 1, further wherein it includes the steps of:
   detecting when each of the sections has returned to its normal operating condition after the accumulation of products formed thereon has been taken up, and then returning the operating speed of that section to its speed under normal operating conditions, and
   re-establishing the operation of the handling station at the given speed when all the sections have returned to their normal operating conditions.

3. A method for regulating the advance of products to be packaged towards a handling device which can take in the products at a first given speed, wherein the method comprises the steps of:
   providing, upstream of the handling device in the direction of flow of the products, first conveyor means for metering the products and second conveyor means for spreading out the products, the second conveyor means moving at a speed substantially greater than the first conveyor means,
   monitoring the flow of products on the second conveyor means and identifying at least one first and one second operation condition corresponding respectively to a satisfactory flow and to a reduced flow of products, and
   causing the first conveyor means to move at:
   at least one first metering speed which is slightly slower than the first given speed when a satisfactory flow of products is detected on the second conveyor means, and
   at least one second metering speed which is faster than the first given speed when a reduced flow of products is detected on the second conveyor means.

4. A method according to claim 3, wherein the method includes the steps of detecting, in the handling device, a persistent shortage in the flow of products and of stopping the movement of the handling device when the shortage of products persists, the first and second conveyor means being kept operational to collect a certain quantity of products to be handled upstream of the handling device.

5. A method for regulating the advance of products to be packaged from a supply station towards a handling station, the handling station being situated downstream of the supply station in the direction of flow of the products and including a handling device which can take in the products at at least a first given speed and which stops for certain periods of time, motor-driven conveyor means being interposed between the supply station and the handling station for collecting products which accumulate during the periods in which the handling station is stopped, wherein the method comprises the steps of:
   dividing the motor-driven conveyor means into a plurality of section in series, with the furthest downstream section adjacent the handling station,
   monitoring the flow of products on the sections so as to identify, for each section, at least one normal operating condition in which the section is not completely filled and one condition in which the section is completely filled with accumulated products,
   controlling movement of each of the sections when its filled condition is detected so that movement of each section is the same as movement of the section immediately downstream, movement of the section furthest downstream being the same as movement of the handling station,
   providing, downstream of the motor-driven conveyor means and upstream of the handling device in the direction of flow of the products, first conveyor means for metering the products and second conveyor means for spreading out the products, the second conveyor means moving at a speed substantially faster than the first conveyor means,
   monitoring the flow of products on the second conveyor means and identifying at least one first and one second operating condition corresponding respectively to a satisfactory flow and to a reduced flow of products, and
   causing the first conveyor means to move at:
   at least one first metering speed which is slightly slower than the first given speed when a satisfactory flow of products is detected on the second conveyor means, and
   at least one second metering speed which is faster than the first given speed when a reduced flow of products is detected on the second conveyor means.

6. Equipment for regulating the advance of products to be packaged from a supply station towards a handling station which is situated downstream of the supply station in the direction of flow of the products and which stops for certain periods of time, comprising:

motor-driven conveyor means comprise a plurality of sections in series with the furthest downstream section adjacent the handling station, sensor means are provided for monitoring the flow of products on the sections so as to identify, for each section, at least one normal operating condition when the section is not completely filled and one condition in which the section is completely filled with accumulated products, means are provided for controlling movement of each of the sections by controlling a drive motor means for the sections, the control means being connected to the sensors and being able to act on the sections when the completely filled condition of the section is detected so that movement of each section is the same as movement of the section immediately downstream, movement of the section furthest downstream being the same as movement of the handling section, wherein the control means are arranged to cause the handling station to operate at a given speed when the sections are all operating normally, the sensor means detecting the condition in which at least some of the sections have stopped as a result of the stoppage of the handling station; and wherein the motor means restarts the handling station at an accumulation-take-up speed which is faster than the given speed so that all the sections which are in the filled condition also move at an accumulation-take-up speed.

7. Equipment according to claim 6, wherein the control means are arranged so as:

to detect, still by means of the sensor means, when each of the sections has returned to its normal operating condition after the accumulation of products formed thereon has been taken up, the speed of operation of the section then being returned to its speed of movement under normal operating conditions, and to re-establish the operation of the handling station at the given speed when all the sections have returned to their normal conditions of filling.

8. Equipment according to claim 6, wherein the sensor means are constituted principally by optical sensors.

9. Equipment according to claim 6, wherein the control means are constituted substantially by a PLC module.

10. Equipment for regulating the advance of products to be packaged towards a handling device which can take in the products at a first given speed, comprising:

upstream of the handling device in the direction of flow of the products, first conveyor means for metering the products and second conveyor means for spreading out the products, the second conveyor means moving at a speed substantially faster than the first conveyor means, sensor means for monitoring the flow of products on the second conveyor means and for identifying at least one first and one second operating condition corresponding respectively to a satisfactory flow and to a reduced flow of products, and means for controlling the movement of the first conveyor means, connected to the sensor means and able to cause the first conveyor means to move at, at least one first metering speed which is slightly slower than the first given speed when the sensor means detect a satisfactory flow of products on the second conveyor means, and at least one second metering speed which is faster than the first given speed when the sensor means detect a reduced flow of products on the second conveyor means.

11. Equipment according to claim 10, wherein a further sensor means for detecting a persistent shortage in the flow of products in the handling device and in that the control means can stop the movement of the handling device when the shortage of products persists, the first and second conveyor means being kept activated to collect a certain quantity of products to be handled upstream of the handling device.

12. Equipment according to claim 10, wherein the sensor means are constituted principally by optical sensors.

13. Equipment according to claim 10, wherein the control means are constituted substantially by a PLC module.

14. Equipment for regulating the advance of products to be packaged from a supply station towards a handling station, the handling station being situated downstream of the supply station in the direction of flow of the products, comprising a handling device which can take in the products at at least one first given speed and which stops for certain periods of time, motor-driven conveyor means being interposed between the supply station and the handling station for moving the products between the supply station and the handling station as well as for collecting products which accumulate during the periods in which the handling station is stopped, wherein:

the motor-driven conveyor means comprise a plurality of sections in series with the furthest downstream section facing the handling station, sensor means are provided for monitoring the flow of products on the sections so as to identify, for each section, at least one normal operating condition in which the section is not completely filled and one condition in which the section is completely filled with accumulated products, means are provided for controlling movement of each of the sections by controlling a motor drive means for each of the sections, the control means being connected to the sensor means and being able to act on the sections, when that in the completely filled condition of the section is detected, so that movement of each section is the same as movement of the section immediately downstream, movement of the section furthest downstream being the same as movement of the handling station, there are provided downstream of the motor-driven conveyor means and upstream of the handling device in the direction of flow of the products, first conveyor means for metering the products and second conveyor means for spreading out the products, the second conveyor means moving at a speed substantially faster than the first conveyor means, the sensor means include at least one unit which is sensitive to the flow or products on the second conveyor means and which can identify at least one first and one second operating condition corresponding respectively to a satisfactory flow and to a reduced flow of products, and the control means are connected to the at least one unit and can cause the first conveyor means to move at:

at least one first metering speed which is slightly slower than the first given speed when the at least one unit detects a satisfactory flow of products on the second conveyor means, and at least one second metering speed which is faster than the first given speed when the at least one unit detects a reduced flow of products on the second conveyor means.

15. Equipment according to claim 14, wherein the sensor means are constituted principally by optical sensors.

16. Equipment according to claim 14, wherein the control means are constituted substantially by a PLC module.

* * * * *